(12) United States Patent
Nahm et al.

(10) Patent No.: US 10,969,524 B2
(45) Date of Patent: Apr. 6, 2021

(54) DYE MICROENVIRONMENT

(71) Applicant: Vision Ease, LP, Ramsey, MN (US)

(72) Inventors: Steven Harold Nahm, Minneapolis, MN (US); David Jerrel Kissel, Andover, MN (US); Richard Blacker, Lino Lakes, MN (US)

(73) Assignee: Vision Ease, LP, Ramsey, MN (US)

( * ) Notice: Subject to any disclaimer, the term of this patent is extended or adjusted under 35 U.S.C. 154(b) by 529 days.

(21) Appl. No.: 14/751,043

(22) Filed: Jun. 25, 2015

(65) Prior Publication Data
US 2015/0378181 A1  Dec. 31, 2015

Related U.S. Application Data

(60) Provisional application No. 62/017,150, filed on Jun. 25, 2014.

(51) Int. Cl.
*G02B 5/23* (2006.01)
*C09K 9/02* (2006.01)

(52) U.S. Cl.
CPC . *G02B 5/23* (2013.01); *C09K 9/02* (2013.01)

(58) Field of Classification Search
CPC combination set(s) only.
See application file for complete search history.

(56) References Cited

U.S. PATENT DOCUMENTS

| 7,247,262 B2 * | 7/2007 | Evans | C07D 311/92 |
| | | | 252/582 |
| 2007/0244219 A1 * | 10/2007 | Vaidya | C09D 11/101 |
| | | | 523/160 |
| 2015/0152322 A1 † | 6/2015 | Nakayama | |

FOREIGN PATENT DOCUMENTS

| EP | WO03/001555 | * | 1/2003 |
| WO | WO2003/001555 | * | 1/2003 |
| WO | WO 2003/001555 A1 | | 1/2003 |
| WO | 2006019435 | † | 2/2006 |
| WO | WO2006/019435 A1 | | 2/2006 |
| WO | WO 2013/106420 A1 | | 7/2013 |
| WO | WO2014/007154 A1 | | 1/2014 |

OTHER PUBLICATIONS

WIPO, U.S. International Search Authority, International Search Report and Written Opinion dated Sep. 30, 2015 in International Patent Application No. PCT/US2015/037818, 11 pages.
European Patent Office, Supplementary European Search Report dated Dec. 22, 2017 in European Patent Application No. EP15810846.4, 12 pages.
The Patent Office (India), Opposition to Grant in India Patent Application No. 201717002362 dated Nov. 30, 2017, 27 pages.

\* cited by examiner
† cited by third party

*Primary Examiner* — Monique R Peets
(74) *Attorney, Agent, or Firm* — Inskeep IP Group, Inc.

(57) ABSTRACT

An optimized photochromic dye microenvironment isolated from and dispersed within a distinct host phase.

28 Claims, 10 Drawing Sheets

Figs. 8A-C

DYE MICROENVIRONMENT

RELATED APPLICATIONS

This application claims priority to U.S. Provisional Application Ser. No. 62/017,150 filed Jun. 25, 2014 entitled Photochromic Dye Microenvironment, which is hereby incorporated herein by reference in its entirety.

FIELD OF THE INVENTION

The present invention pertains to colorants and, more particularly, to the optimization of colorant characteristics within a host medium.

BACKGROUND OF THE INVENTION

Photochromic dye molecules absorb light, e.g. UV light, which leads to a thermally reversible conformation change or isomerization, frequently by ring opening, which results in a color change. This bond rearrangement causes the colored form of the dye molecule to occupy a different, frequently larger, volume than the leuco, or colorless form of the dye.

Photochromic dye behavioral characteristics, including expressed color or activation and fading rates, all depend on specific details of the structure of the dye molecule. Consequently, dye color, activation and fading rates are difficult to control independently by changing specific dye molecule structural attributes, i.e. altering a substituent on the dye molecule to increase fading speed will also generally change the color of the activated dye molecule as well, and vice versa. Fine-tuning dye characteristics through synthesis of different dye structures and evaluating such behaviors is a long and arduous task, and critically, these characteristics are difficult to predict accurately.

Accordingly, there exists a need in the art for highly controllable, robust techniques for controlling and optimizing photochromic dye behavior in diverse applications and environmental conditions.

SUMMARY OF INVENTION

One embodiment of the present invention provides photochromic dye optimization and characteristic control that are substantially more convenient to practice than dye molecule synthesis, and which can be used to independently alter and control the behavioral attributes of a given dye. Specifically, by controlling the microenvironment around the dye, its color and activation/fading rates can be adjusted as desired.

Certain embodiments of the present invention further provide for isolation of the dye microenvironment from a surrounding or host matrix. In certain applications, the desired components of the dye microenvironment may limit the performance characteristics of a bulk matrix in which the dye-microenvironment is employed. By isolating the dye, surrounded by the preferred microenvironment, as a dispersed phase within a continuous host matrix phase designed for the end use application, the desired performance characteristics of both the dye and the host matrix can be optimized independently.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
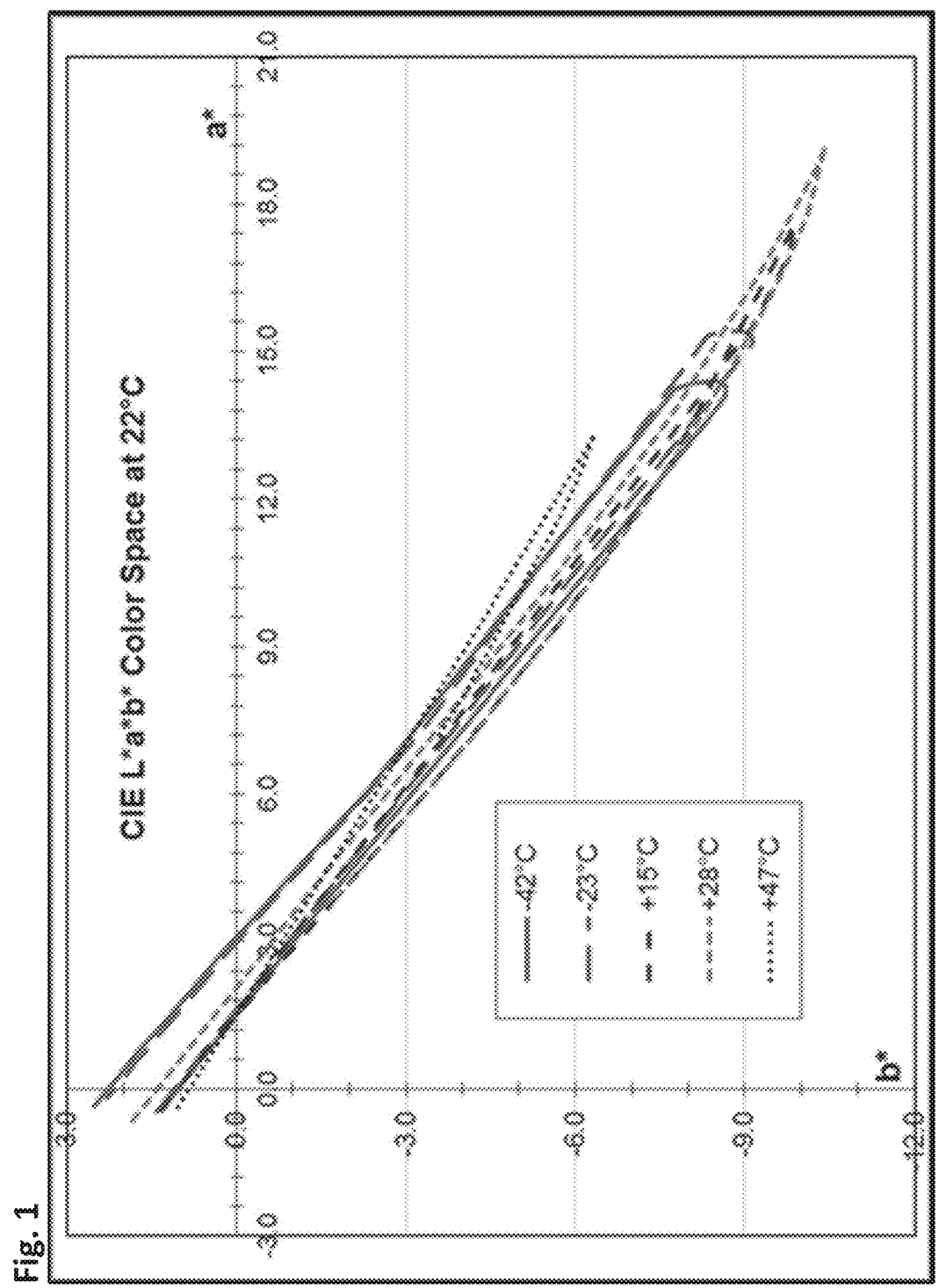
FIG. 1 is a graph showing examples of the optimization of dye color responses by manipulation of matrix glass transition temperature, according to one embodiment of the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

For the sake of clarity, in the following disclosure, the term "dye" or "colorant" broadly includes compounds that absorb visible light, exhibiting permanent or temporary (dynamic) color in response to an eternal stimulus such as UV light and, more particularly, molecules and compounds having photochromic, electrochromic, liquid crystal, non-photochromic coloration, and tinting characteristic or type-characteristics.

The term "microenvironment" refers to the components in the immediate vicinity or that are the nearest neighbors surrounding a dye or colorant. These components are generally considered to be close enough to the dye or colorant to influence the behavior of the dye or colorant through direct contact, such as hydrogen bonding, or through special interactions, such as dipole-dipole interactions. The dye microenvironment can also be described by the term "solvation shell", commonly used to describe the volume of material immediately surrounding an ion or molecule in a solution. The components of the "microenvironment" can comprise polymer segments, e.g. portions of large molecules; plasticizers, e.g. oligomers or other molecules which can modify the behavior of the polymer segments; and/or solvent molecules which can further modify mobility of polymer segments, plasticizers and/or dyes or colorants or portions thereof.

For example, in a salt solution, as in common table salt, sodium chloride (NaCl), or a sugar solution, as in sugar in coffee, the water dissolves (separates) the individual ions (Na+, Cl−) or glucose molecules ($C_6H_{12}O_6$) of the crystals by providing stabilizing interactions, either dipole-dipole interactions through space, or hydrogen bonding through direct contact, making it energetically favorable for the crystals to disintegrate into individual ions or molecules.

The term "dye matrix" or "colorant matrix" is a general term and includes the microenvironment and other components which may be present both immediately surrounding and/or further away from the dye molecules. The dye matrix can influence dye response. For example, the dye matrix may influence a dye's activation and fading rates through the dye matrix's glass transition temperature as described in detail below. The dye matrix may also influence dye responses through effects or interactions based on chemical functional groups, which may be present and interact with the dye molecule through dipole-dipole or hydrogen bonding interactions.

The term "dispersed phase" refers to a separate and discreet region within a continuous phase which comprises of a dye or colorant and the "colorant microenvironment" and the "colorant matrix." By way of analogy, consider a molded gelatin fruit salad. The fruit is analogous to the dispersed phase and the gelatin would analogous to the continuous phase. Another example is the aggregate within concrete; the aggregate or pebbles are analogous to the dispersed phase and the cement is analogous to the continuous phase.

The term "continuous phase" and "host matrix" are interchangeable terms and refer to the compositions or the bulk phases, e.g. the continuous polymer phase, surrounding or containing the individual dispersed phase structures or particles in which one of more dye molecules are distributed or dissolved. The continuous phase is farther away from the dye molecules than the solvation shell, and will have little, if any, direct influence on the dye behavior, as long as the dye is within a separate, dispersed phase microenvironment. In order for the bulk properties of the continuous host matrix phase thermo-mechanical properties to dominate the matrix behavior, the continuous phase must generally be present in an equivalent or larger volume percent than the dispersed phase.

Optimization of Dye Activity

Broadly speaking, in certain embodiments of the present invention, photochromic dye microenvironment characteristics are manipulated to independently control photochromic dye color, temperature sensitivity, activation ($k_1$) and fading or decay ($k_2$) rates, among other characteristics.

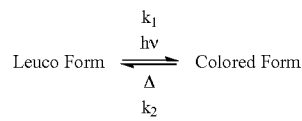

One controllable characteristic of the photochromic dye microenvironment is the glass-transition temperature of the dye matrix directly surrounding the photochromic dye. Dye matrix glass-transition temperature influences a dye molecule's response rate for activation ($k_1$) and decay ($k_2$).

For example, in a dye matrix with a glass-transition temperature substantially higher than the ambient temperature, at the time ultraviolet, UV, radiation is absorbed by the leuco dye form, the ability of the local polymer segments around the dye molecule to "move out of the way" is reduced, inhibiting the ability of the dye molecule to ring-open to the colored form (reducing $k_1$). Importantly, this also interferes with its ability to undergo the reversible ring closure to the original leuco form (reducing $k_2$). Conversely, when the glass-transition temperature of the dye matrix is substantially lower than the ambient temperature at which UV activation occurs, segmental motion in the dye matrix is faster, and the dye molecule can change conformation to the colored form or back to the leuco form with less resistance by the immediate environment (increasing both $k_1$ and $k_2$).

A second controllable characteristic of photochromic dye microenvironment is the polarity of the dye matrix directly surrounding the photochromic dye. Dye matrix polarity, in part, influences the color responses of a particular dye. The dye matrix polarity influences the intensity of color response, e.g. more polar (or hydrogen bonding) environments lead to more neutral colors.

Not to be bound by theory, this controlled characteristic, in part, influences dye molecule performance by the way the dye molecule interacts with those molecules immediately surrounding it, a kind of solvatochromism. The dye matrix molecules closest to the dye molecule, those within the "solvation shell", can chemically interact with the functional groups present in the dye molecule. These interactions can be through space, as in dipole-dipole interactions, and by "direct contact", for example through hydrogen bonding. In both cases, these interactions subtly modify the details of electron distribution within the dye molecule, which influences the wavelengths absorbed by the dye, changing both its UV and visible spectra in the leuco and colored forms.

The microenvironment influences the intensity of the dye color response, where a more strongly interacting solvation shell (polar or hydrogen bonding) leads to more neutral colors, and in some cases can influence dye activation ($k_1$), and particularly the decay rate ($k_2$, indicated by half-life $t_{1/2}$) of the dye.

Dye Optimization Example 1: Effects of Model Dye Matrix Glass Transition Temperature on Dye Activation and Fade Rates A single component photochromic naphthopyran dye was tested in laminates prepared from a series of model acrylic copolymers comprising n-butyl and t-butyl acrylate monomer mixtures, dye color responses were very similar, but dye activation and fading rates depended strongly on both test temperature and matrix glass-transition temperature. Tests were performed at 0, 10, 22 and 35 degrees Celsius; matrix glass transition temperature ranged between −42° C. and +47° C. The results are graphically summarized in FIGS. 1, 2 and 3.

These results clearly demonstrate (a) that dye matrix glass-transition temperature has little effect on color, and (b) that dye matrix glass-transition temperature must be well below the test temperature to exhibit the fastest activation and fading rates.

Figure 4:
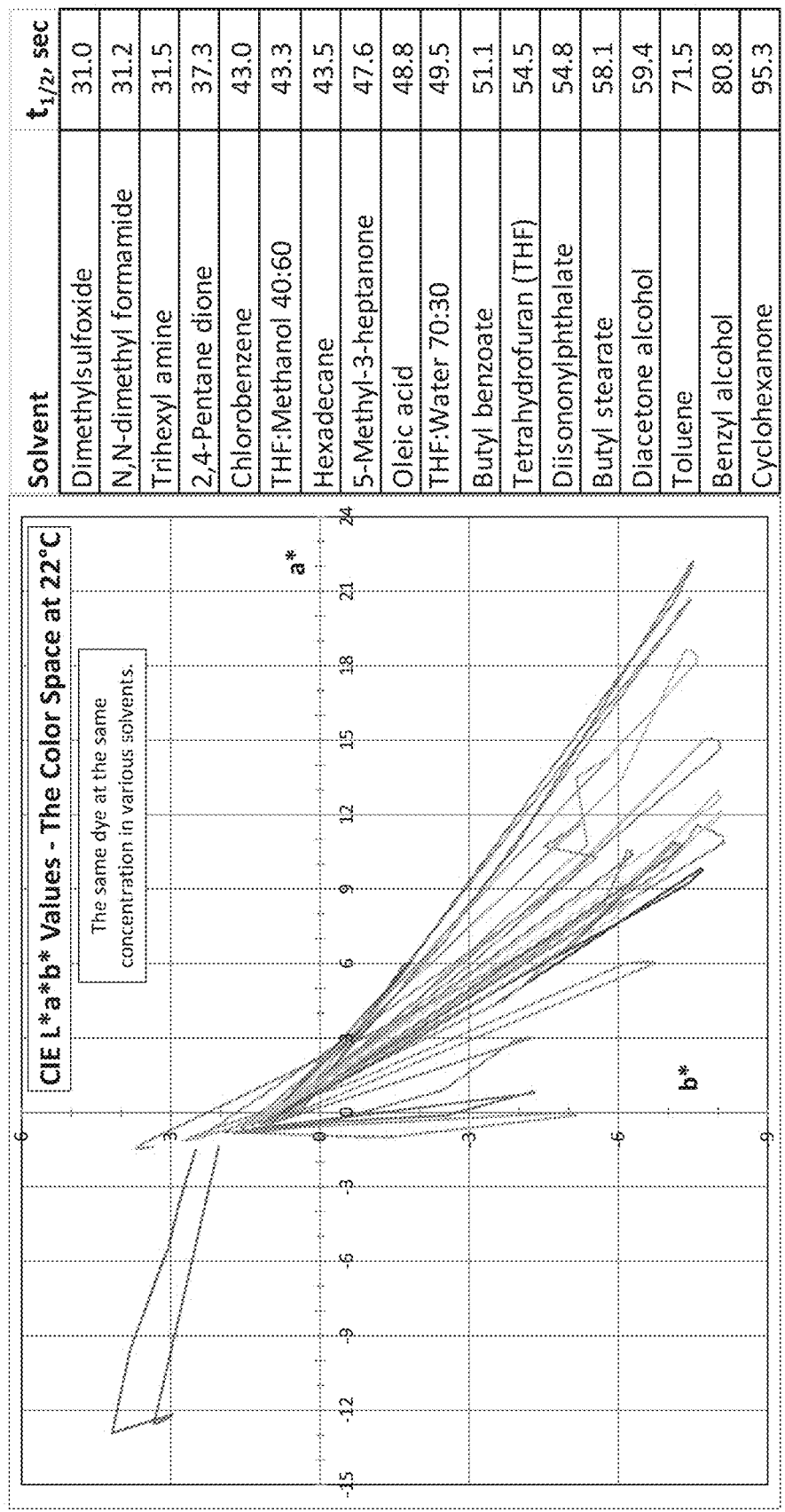
FIG. 4 is a graph showing examples of the optimization of dye color responses and half-lives by manipulation of matrix solvents, according to one embodiment of the present invention.

Dye Optimization Example 2: Influence of Chemical Environment on Dye Response; Solvent Models A single component photochromic naphthopyran dye was tested in a variety of solvents that presented different chemical environments (0.20 weight percent dye and 1 millimeter path length), it exhibited a wide range of color responses as illustrated in FIG. 4, as well as a 3-fold range of fading rates, which are characterized by half-life $(t_{1/2})$". In any given solvent, whether tested at 0 or 22 degrees Celsius, the color exhibited was very similar, but the fading rates all decreased at the lower test temperature.

Figure 5:
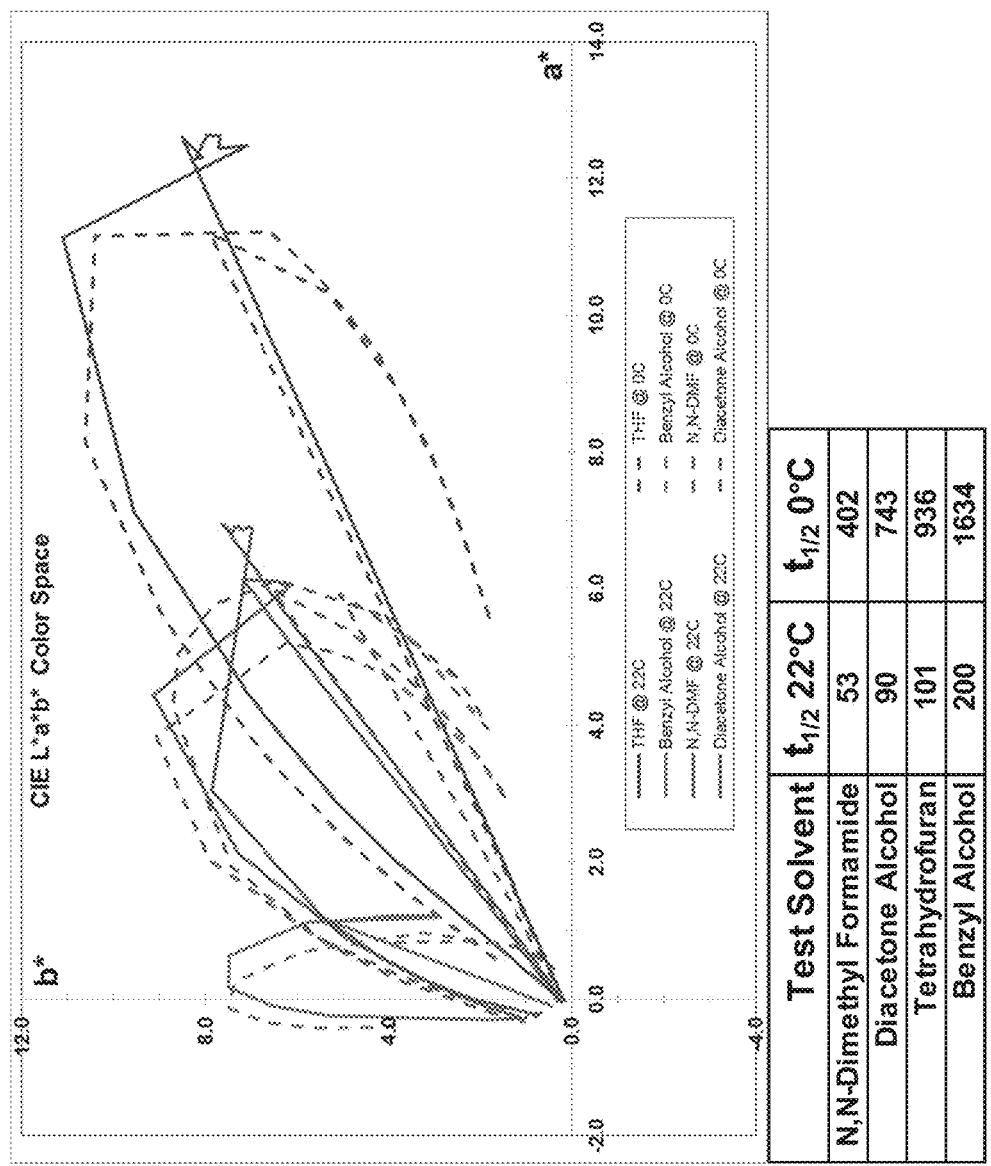
FIG. 5 is a graph showing examples of the optimization of dye color responses and half-lives by manipulation of matrix solvents, according to one embodiment of the present invention.

Similarly, another single-component photochromic dye tested in selected solvents exhibited different color responses with half-lives that varied over a 4-fold range (FIG. 5).

Figure 6A:
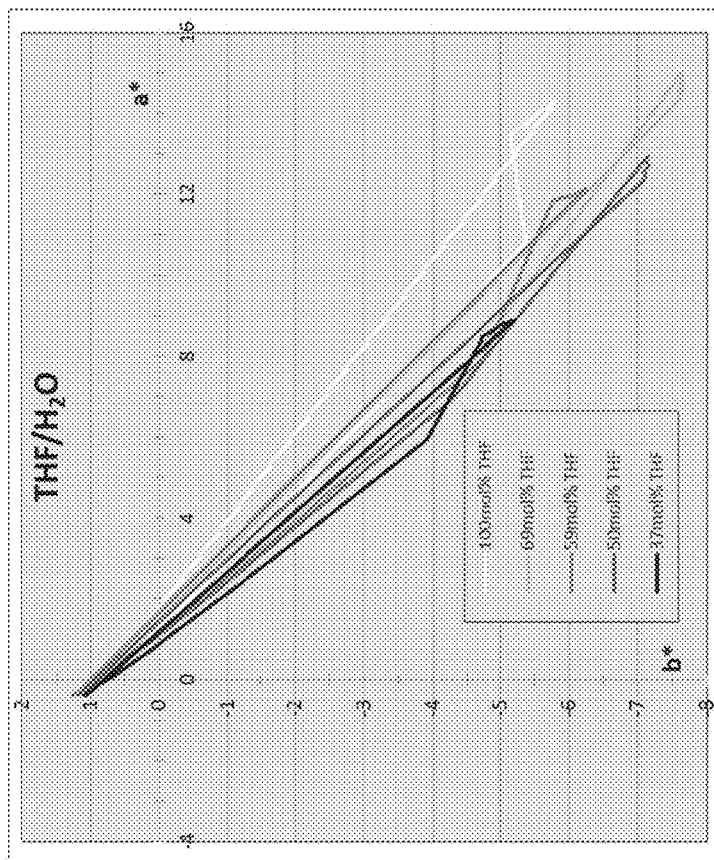
FIGS. 6A and 6B are graphs showing examples of the optimization of dye color responses by manipulation of polar cosolvents, according to one embodiment of the present invention.
Figure 6B:
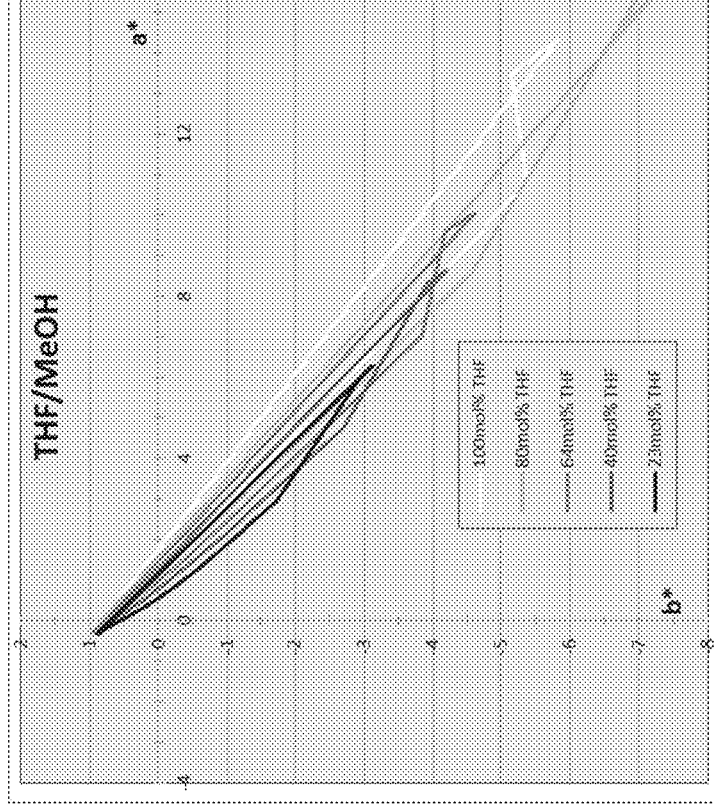

In two mixed solvent systems (THF with methanol or water added), systematic changes in dye color were observed as the polar cosolvent level increased. No significant differences were observed for dye activation rates or fading half-lives (FIGS. 6A and 6B):

The above examples demonstrate that in more polar environments, or those capable of strong hydrogen bonding, the dye exhibits the most neutral colors, while in less polar environments the dye is more strongly colored, as indicated by the length of the radius ($a^*$ and $b^*$ values) in the color space plots.

Figure 7:
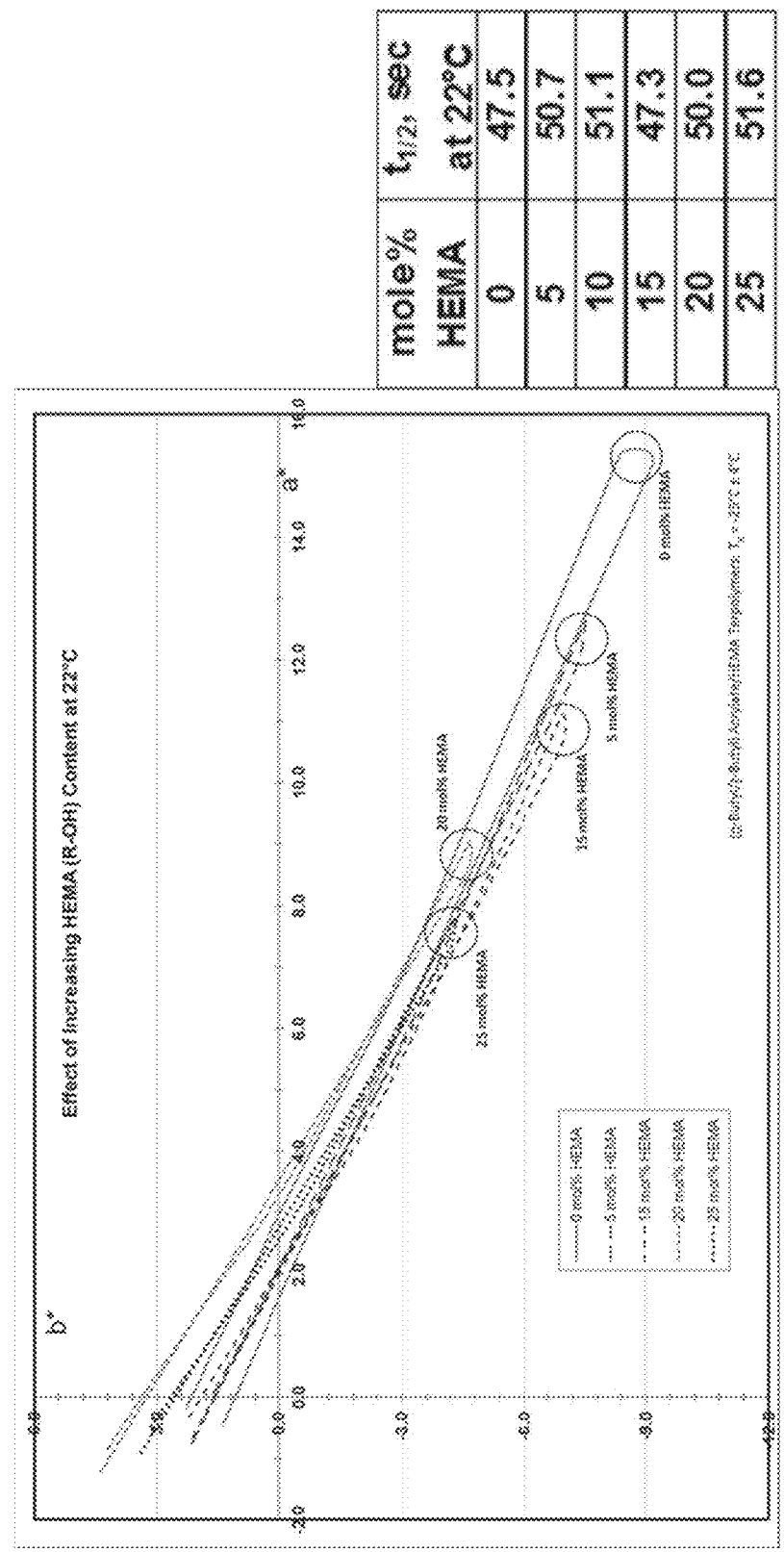
FIG. 7 is a graph showing examples of the optimization of dye color responses by manipulation of HEMA in an acrylate copolymer, according to one embodiment of the present invention.
Figure 8:
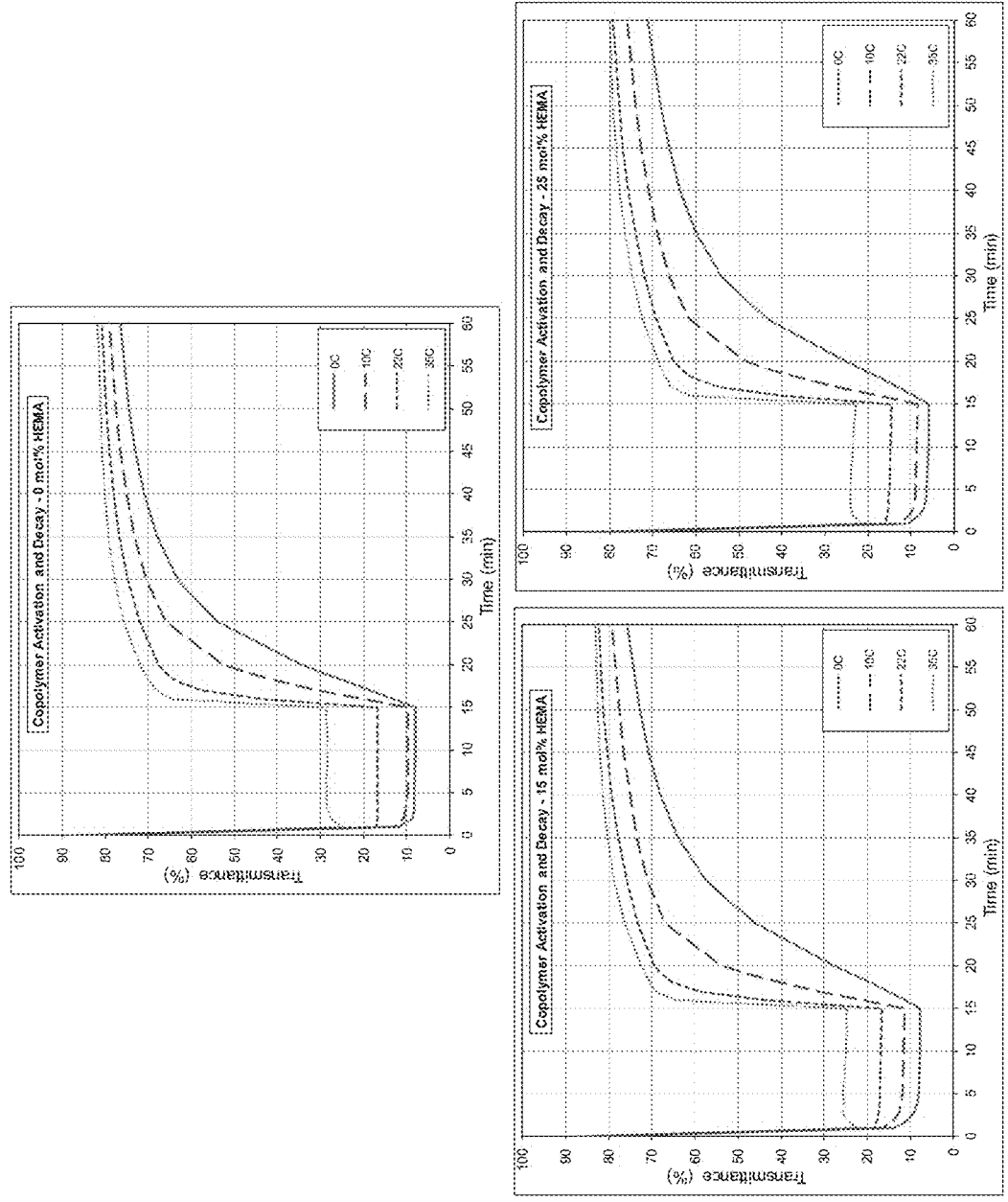
FIGS. 8A-8C are graphs showing examples of the optimization of dye activation and fading by manipulation of the matrices at different temperatures, according to one embodiment of the present invention.

Dye Optimization Example 3: Influence of Chemical Environment on Dye Response; Polymer Matrix Models A series of terpolymers with similar low glass-transition temperature (−25±4 degrees Celsius), but with varying polarity/hydrogen bonding capabilities, were prepared from mixtures of n-butyl/t-butyl acrylate and 2-hydroxyethyl methacrylate (HEMA). The dye was added to these copolymer solutions, which were laminated between polycarbonate films and evaluated for color response (FIG. 7) by UV-visible spectrophotometry, activation and fading rates at 0, 10, 22, and 35 degrees Celsius (FIGS. 8A-8C). The 10 molar percent HEMA film is excluded from the figure for clarity.

Dye activation and fading rates $(t_{1/2})$ were similar for all laminates at any test temperature (FIG. 8A-8C), but the higher the HEMA content, the more neutral was the color exhibited (smaller values of $a^*$ and $b^*$): the color trends observed in the mixed solvent models translated to the polymeric matrices.

Dye Matrix

Certain embodiments of the present invention employ compositions comprising one or more dyes and a dye matrix comprising one or more additives chosen to independently control and modify the color and the activation and fading response of the dye(s), and one or more dye modifiers.

Colorants or dyes may be either permanent or dynamic. Permanent colorants include traditional dyes and pigments, including metameric and magnetic pigments, which can change color or alignment under different lighting or magnetic environments. Permanent colorants are generally soluble dyes but may also be pigments having sufficiently small particle size, for example, less than 10 nanometers. Such permanent colorants may alternatively be incorporated within the continuous phase with consideration being taken to the particle size requirements and controlling hazing.

Dynamic colorants may, for example, be any suitable photochromic compounds. For example, organic compounds that, when molecularly dispersed, as in a solution state, are activated (darken) when exposed to a certain light energy (e.g., outdoor sunlight), and bleach to clear when the light energy is removed. They can be selected from benzopyrans, naphthopyrans, spirobenzopyrans, spironaphthopyrans, spirobenzoxzines, spironaphthoxazines, fulgides and fulgimides. Such photochromic compounds have been reported, for example, in U.S. Pat. Nos. 5,658,502, 5,702, 645, 5,840,926, 6,096,246, 6,113,812, and 6,296,785; and U.S. patent application Ser. No. 10/038,350, all commonly assigned to the same assignee as the present invention and all incorporated herein by reference.

Among the photochromic compounds identified, naphthopyran derivatives exhibit good quantum efficiency for coloring, a good sensitivity and saturated optical density, an acceptable bleach or fade rate, and most importantly good fatigue behavior for use in eyewear. These compounds are available to cover the visible light spectrum from 400 nanometer to 700 nanometer. Thus, it is possible to obtain a desired blended color, such as neutral gray or brown, by mixing two or more photochromic compounds having complementary colors under an activated state.

In certain embodiments, the use of variously colored dyes in specific microenvironments which alter the color of the dyes so as to produce neutral grey colors when activated by virtue of the small $a^*$ and $b^*$ values observed in the specific microenvironments is achieved.

Suitable dyes include naphtho[2,1b]pyrans and naphtho [1,2b]pyrans represented by the following generic formula:

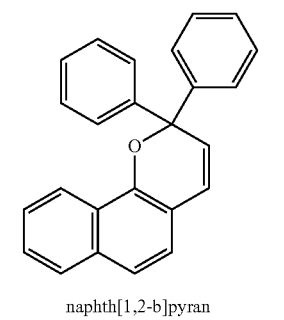

naphth[1,2-b]pyran

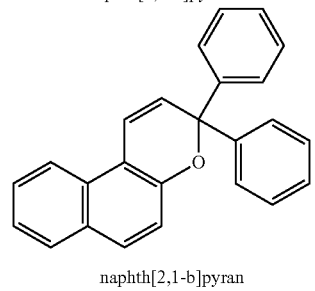

naphth[2,1-b]pyran

In certain embodiments of the present invention, the colorants include one or more photochromic dyes and optionally, one or more permanent dyes and/or pigments. In certain embodiments, the colorants only include permanent dyes and/or pigments.

In certain embodiments of the present invention, the dye matrix glass transition temperature is tuned to maximize the dye optical density (optimize the dye dark state) according to the desired application temperature. The dye matrix may, for example, comprise (co)polymers of one or more (co) monomers with structural attributes capable of independently modifying the color, activation and fading response of the dye(s) through glass transition temperature and polarity/hydrogen bonding characteristics. For example, the dye matrix (co)polymers may, for example, comprise (co)monomers that provide (co)polymers with a glass transition temperature selected to provide activation and fading rates optimized for the end use application.

The (co)monomers from which the dye matrix (co)polymers are synthesized, employ such structural attributes as hydroxyl and ether groups (R—OH and $R_1$—O—$R_2$), ester groups ($R_a$—[C=O]—$OR_b$), ketone groups ($R_a$—[C=O]—$R_b$), amine groups ($R_a NHR_b$), nitro groups (R—$NO_2$), carbonate groups ($R_a$O—[C=O]—$OR_b$), amide groups ($R_a$NH—[C=O]—$R_b$), urethane groups ($R_a$NH—[C=O]—$OR_b$), urea groups ($R_a$NH—[C=O]—$NHR_b$), imide groups ($R_a$—[C=O]—NH—[C=O]—$R_b$), hydrazide, semicarbazide and semicarbazone groups ($R_a$—[C=O]—NH—$NHR_b$, $R_a$—NH—[C=O]—NH—$NHR_b$ and $R_a$NH—[C=O]—NH—N=$CR_b R_c$), thiol and thioether groups (R—SH and $R_a SR_b$), sulfoxide and sulfone groups ($R_a$—[S=O]—$R_b$ and $R_a$—[$SO_2$]—$R_b$), ester groups ($R_a$—[$SO_2$]—$OR_b$), phosphines and phosphine oxides ($R_a R_b R_c$P and $R_a R_b R_c$P=O), esters ($R_a[R_b O]$-α[=O]—$OR_c$), phosphate esters ([RO]$_3$P=O), and the like, which are polar (have high dielectric constants) and which can interact with, for example, the photochromic dyes by donating and/or accepting hydrogen bonds. As herein used, the structural definitions of "R" groups is in accordance with that of organic and polymer chemistry. "R" is a short-hand convention used to represent generic structures, which structures predominantly contain carbon and hydrogen atoms bonded together in unspecified configurations. In this context, the groups R are independently chosen and can be the same or different, and in many cases, either, but not both R groups, can be a hydrogen atom.

The (co)polymers that employ the color modifying polar structural attributes may be present as connectors between two or more monomers from which the polymer is built, or preferably, which connect two or more structural groups within the (co)monomers, or more preferably, as end groups within the (co)monomers.

Certain embodiments of the present invention further employ additives containing polar structural attributes capable of independently modifying the color, activation and fading response of the dye(s) through their modification of the polymer glass transition temperature and possess high local polarity/hydrogen bonding characteristics. Such additives may act to lower or raise the glass transition temperature of the polymer dye matrix. Such polar structural attributes include hydroxyl and ether groups (R—OH and $R_1$—O—$R_2$), ester groups ($R_a$—[C=O]—$OR_b$), ketone groups ($R_a$—[C=O]—$R_b$), amine groups ($R_a NHR_b$), nitro groups (R—$NO_2$), carbonate groups ($R_a$O—[C=O]—$OR_b$), amide groups ($R_a$NH—[C=O]—$R_b$), urethane groups ($R_a$NH—[C=O]—$OR_b$), urea groups ($R_a$NH—[C=O]—$NHR_b$), imide groups ($R_a$—[C=O]—NH—[C=O]—$R_b$), hydrazide, semicarbazide and semicarbazone groups ($R_a$—[C=O]—NH—$NHR_b$, $R_a$—NH—[C=O]—NH—$NHR_b$ and $R_a$NH—[C=O]—NH—N=$CR_b R_c$), thiol and thioether groups (R—SH and $R_a SR_b$), sulfoxide and sulfone groups ($R_a$—[S=O]—$R_b$ and $R_a$—[$SO_2$]—$R_b$), ester groups ($R_a$—[$SO_2$]—$OR_b$), phosphines and phosphine oxides ($R_a R_b R_c$P and $R_a R_b R_c$P=O), esters ($R_a[R_b O]$-α[=O]—$OR_c$), phosphate esters ([RO]$_3$P=O), and the like, which are polar (have high dielectric constants) and which can interact with the dynamically responsive dyes by donating and/or accepting hydrogen bonds.

In certain embodiments of the present invention, the dye matrix further employs one or more modifiers. There is no restriction to the use of a single microenvironment modifier in the dispersed phase. More than one type of modifier-containing dispersed phase can be present within the continuous phase, with each type comprise one or more photochromic dyes, permanent dyes or pigments to further modify the color, one or more modifiers to alter the dye microenvironment and the color response characteristics of the photochromic dye or dyes. Thus, the dispersed phase can be comprise a mixture of dispersed phases, each type with a different characteristic color, temperature sensitivity, activation or fading rate, based on the combination of different modifiers with the same or different colorants. Not only can this provide an optimized color, but also enables the rate of change between the activated and non-activated states to be optimized. Use of such dispersed phases can provide articles with no or some color under normal visible light, which adopt an additional color after UV irradiation, and which will fade over time after removal of the activating UV light back to the original colorless or colored state.

Two principal types of dye modifiers may be employed. One type can be broadly described as "solvents", which are electrically neutral molecules that are generally liquids, but which may also be semisolids or solids, while the other type is broadly defined as ionic compounds (salts), which are generally solids, but which may also be liquids ("ionic liquids"). These modifiers are compatible with the photochromic and traditional permanent dyes in that they are substantially miscible with them and do not form a separate phase. They can be used separately or in mixtures as desired to accomplish the final appearance and behavior of the separate dye-containing phase.

Solvent type of modifiers can include classic liquid solvents such as the common alcohols, ethers, acids, esters, aliphatics, aromatics, amines and the like. Note that classic solvents generally possess lower molecular weights, and are further characterized by boiling point. A low boiling point solvent is fugitive, and a high boiling point solvent is persistent. Fugitive solvents will readily evaporate under mild conditions and tend to have lower molecular weights, typically less than about 200 Daltons, while persistent solvents will not readily evaporate and tend to have higher molecular weights, typically above 200 Daltons.

In certain embodiments, the dispersed phase contains solvent type microenvironment modifiers primarily comprising combinations of the elements carbon (C), hydrogen (H), oxygen (O), nitrogen (N), sulfur (S), and phosphorus (P) in configurations which have permanent dipole moments or which are capable of donating and/or accepting hydrogen bonds.

Additionally, persistent solvents may possess specific structural attributes such as high polarity or a strong tendency to form hydrogen bonds, which will allow a lower molecular weight material to have an exceptionally high boiling point for its molecular weight. Two materials that demonstrate this concept include glycerin, which possesses three alcohol (R—OH) groups that contribute both high polarity and a strong tendency to form hydrogen bonded networks, has a low molecular weight of only 92 Daltons, and a boiling point of 290 degrees Celsius (persistent); and heptane, which is neither polar nor capable of forming hydrogen bonds, has a similar low molecular weight of 100 Daltons and a boiling point of only 98 degrees Celsius (fugitive).

Additional suitable modifiers may include 1,4-butand diol, benzyl alcohol, butyl 3-hydroxybutyrate, hexadecane, dimethyl sulfoxide, sulfolane, N,N-dimethylformafide, cyclohexanone, methyl 3-heptanone, 1-(2-hydroxethyl)-2-pyrrolidone, chlorobenzene, 4-hydroxly-4-methyl-2-pentanone, propylene glycol monomethyl ether, and trihexylamine.

Also falling within this class are materials generically known as "plasticizers", which possess higher molecular weights, typically more than about 300 Daltons, and which are known to soften polymers. Plasticizers may be liquid, resinous, semisolid or even solid, with the key characteristic of total miscibility with the polymers they plasticize. Additional members of this class include oligomers, such as polyethers, polyesters, polycarbonates, polyamides and the like, which have molecular weights greater than about 500 Daltons, depending on the monomer structures and number of monomers incorporated in the oligomer. Suitable plasticizers include butyl stearate, butyl benzonate, glycerol monoricinoleate, diisononyl phthalate, benzyl carbamate, ricinoleic acid, oleic acid, polypropylene glycol 1000, and trimethylolpropane ethoxylate.

Examples of chemical functional groups present in effective photochromic dye solvent type modifiers include hydroxyl and ether groups (R—OH and $R_a$—O—$R_b$), ester groups ($R_a$—[C=O]—$OR_b$), ketone groups ($R_a$—[C=O]—$R_b$), amine groups ($R_a NHR_b$), nitro groups (R—$NO_2$), carbonate groups ($R_a$O—[C=O]—$OR_b$), amide groups ($R_a$NH—[C=O]—$R_b$), urethane groups ($R_a$NH—[C=O]—$OR_b$), urea groups ($R_a$NH—[C=O]—$NHR_b$), imide groups ($R_a$—[C=O]—NH—[C=O]—$R_b$), hydrazide, semicarbazide and semicarbazone groups ($R_a$—[C=O]—NH—$NHR_b$, $R_a$—NH—[C=O]—NH—$NHR_b$ and $R_a$NH—[C=O]—NH—N=$CR_b R_c$), thiol and thio-ether groups (R—SH and $R_a SR_b$), sulfoxide and sulfone groups ($R_a$—[S=O]—$R_b$ and $R_a$—[$SO_2$]—$R_b$), ester groups ($R_a$—[$SO_2$]—$OR_b$), phosphines and phosphine oxides ($R_a R_b R_c$P and $R_a R_b R_c$P=O), esters ($R_a[R_b O]$-α[=O]—$OR_c$), phosphate esters $[RO]_3$P=O), and the like, which are polar (have high dielectric constants) and which can interact with the photochromic dyes by donating and/or accepting hydrogen bonds.

The second type of modifier provides additional through space dipolar interactions to affect the photochromic dye response attributes, and can be introduced by addition of permanently charged (ionic) materials. Such ionic type microenvironment modifiers are generally considered salts which comprise two or more components, each of which possesses a permanent electrical charge and which together balance out to form a neutral material. For example, one part carries one or more positive charges on a single atom, such as metal cations like lithium ($Li^\oplus$), sodium ($Na^\oplus$), potassium ($K^\oplus$), calcium ($Ca^{\oplus\oplus}$) and magnesium ($Mg^{\oplus\oplus}$), or within a cluster of covalently bonded atoms, such as an ammonium ($R_4 N^\oplus$) or phosphonium ($R_4 P^\oplus$) ions. The most preferred cations have a small ionic radius and high charge density, particularly lithium, sodium, magnesium and calcium cations. The other part carries a single negative charge on a single atom, such as on the halide anions fluorine ($F^\ominus$), chlorine ($Cl^\ominus$), bromine ($Br^\ominus$) and iodine ($I^\ominus$), or within a cluster of atoms, such as tetrafluoroborate ($BF_4^\ominus$), hexafluorophosphate ($PF_6^\ominus$), and toluene sulfonate ($H_3 CPhSO_3^\ominus$), or multiple negative charges on clusters of multiple covalently bonded atoms, such as phthalic acid dianions (Ph{—[C=O]$O^\ominus$}$_2$), and the like, as necessary to balance of the positive and negative charges in the ionic modifier. For improved solubility in the dispersed phase, the anions employing low charge densities, such as bromide and particularly iodide, tetrafluoroborate or hexafluorophosphate, or be organic, such as p-toluene sulfonate, and the like may be employed. These modifiers are used in similar molar amounts relative to the amount of photochromic dye present.

The amount of dye microenvironment modifiers present in the dispersed phase employed is sufficient to provide the desired degree of modification of activated color, for example UV activated color, formation within the article. As such, the total amount of modifiers present is from about 100 parts-per-million per micrometer to about 10,000 parts-per-million per micrometer of path length through which the light travels to activate, for example, the photochromic dye in the article. In general, there will be more modifier functional groups present than dye on a molar basis. The amount of modifier will vary by modifier and photochromic dye types, their molecular or functional group equivalent weights, the extinction coefficient of the photochromic dye, the degree and type of interaction between the dye and the modifier, the amount of color change desired, the presence of other colorants such as permanent dyes or pigments, and their extinction coefficients, and so forth. For example, the amount of dye microenvironment plasticizers and low volatility solvents may range from zero weight percent to 100 weight percent or from 20 weight percent to 40 weight percent.

In addition to such additives as described above modifying, for example, photochromic dye attributes of color and activity, these additives can also modify the color/hue perceived for permanent dyes and pigments, providing yet another mechanism to control the appearance and performance of the articles containing the compositions of this invention.

Isolation of Dye Matrix

In certain embodiments of the present invention, a dispersed phase, comprising components chosen to control a dye color and/or other characteristics, is dispersed in a continuous phase, comprising components chosen to control the chemo-thermo-mechanical properties of the bulk composition. For the sake of clarity, the term "continuous phase" may also be understood as a "host matrix."

In practice, the preferred microenvironment and or matrix for dye performance may not provide the desired performance characteristics of the continuous phase in the target application. For example, the fastest dye color decay rates occur in microenvironments with lower glass-transition temperatures. However, continuous phase having a lower glass-transition temperature may not be optimal for an elevated temperature use environment because of the potentially corresponding low mechanical strength, which can lead to bulk host matrix failure under shear or other forces. Consequently, in this example, a key requirement for performance of the dye and the host matrix are incompatible: a host matrix optimized to satisfy the harsh use conditions of the article may not provide adequate performance of the photochromic dye, and vice versa.

Figure 9:
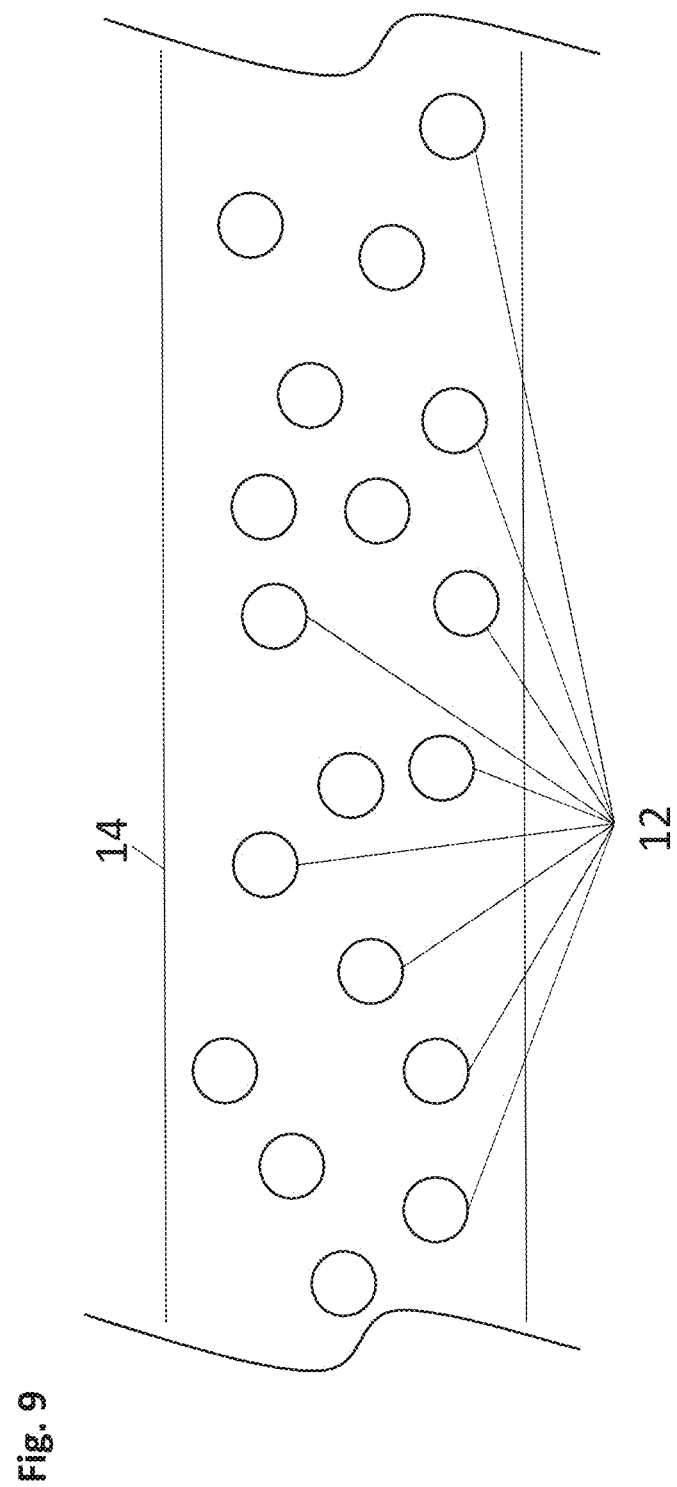
FIG. 9 is a cross-sectional view of a dynamically responsive dye/colorant layer according to one embodiment of the present invention.
Figure 10:
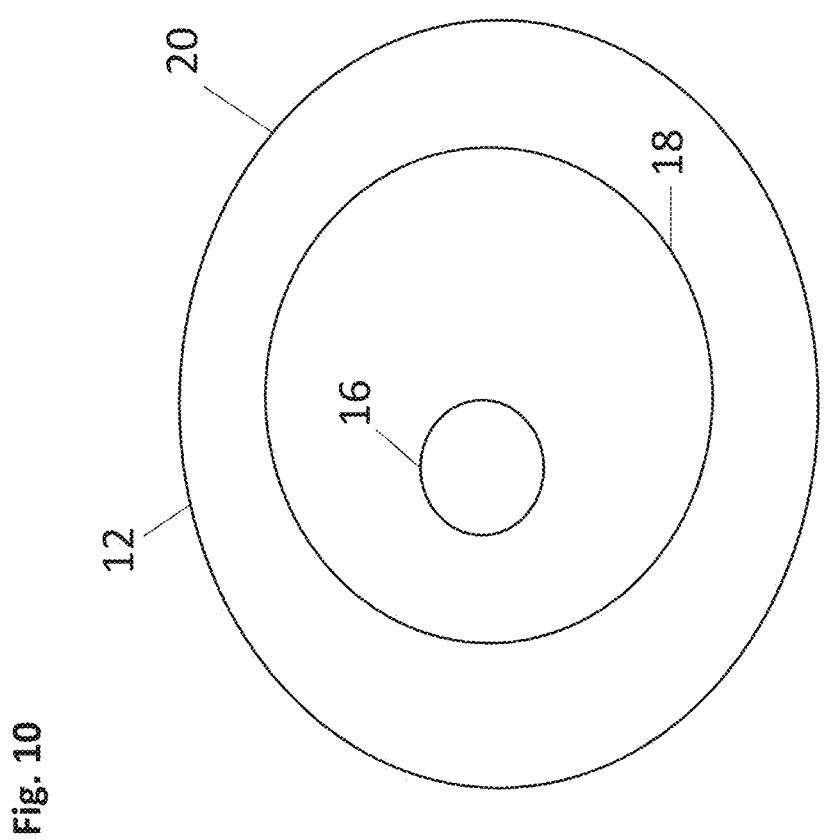
FIG. 10 is a cross-sectional view of a disperse phase according to one embodiment of the present invention.

In certain embodiments of the present invention, with reference to FIGS. 9 and 10, this problem is overcome or minimized by isolating the photochromic dye 16 and the dye microenvironment and dye matrix 18 from the bulk host matrix or continuous phase 14. This objective is accomplished by dispersing the dye and its preferred microenvironment within the host matrix as a separate particle or dispersed phase 12 embedded or encapsulated within the continuous phase 14 which will be dependent on the application. This approach allows the two phases to be optimized separately to meet the performance specifications of the particular end use.

Two key requirements of the dispersed phase are that both the dye and any microenvironment components such as additives and/or modifiers present in the dispersed phase must be permanently contained and cannot diffuse into the continuous phase over time. Both conditions are necessary to maintain consistent performance of the photochromic article over time. Specific structural attributes of the dispersed phase may be necessary to prevent diffusion of the dye and modifiers out of the dispersed phase and into the continuous phase. The composition of the dispersed phase generally requires one or more colorants within a dye matrix and one or more binder materials or systems to permanently contain and separate the active components that generate the principal optical effects from the continuous phase 14.

In certain embodiments of the present invention, binders can include single polymers, (co)polymers, mixtures of (co)polymers, including interpenetrating polymer networks, crosslinkers, and the like, and one or more layers of polymers, copolymers, crosslinkers and the like, as required to meet the key requirements of the dispersed phase performance.

In certain embodiments, the binder materials themselves can further contribute to dye microenvironment compositions, to modify the color of the photochromic dye in addition to preventing the diffusion of the dye into the continuous phase and affect $k_1$ and $k_2$. For example, suitable binders having a relatively high glass transition temperature include, homopoly(t-butyl acrylate), copoly(t-butyl acrylate/2-hydroxyethyl methacrylate), and polyvinyl butyral B98, separately or in combination. Exemplary suitable binders having a relatively low glass transition temperature include, homopoly(n-butyl acrylate), copoly(n-butyl acrylate/2-hydroxyethyl methacrylate), copoly(n-butyl acrylate/2-hydroxyethyl acrylate, copoly(t-buty/n-buty acrylate), copoly (ethylhexyl acrylate/t butyl acrylate), terpoly(t-butyl/n-butyl acrylate/2-hydroxyethyl methacrylate), employed separately or in combination with polyvinyl butyral B98.

There is no restriction to the use of a single binder composition in the dispersed phase, nor to a single layer or outer shell of binder composition within any dispersed phase particle. More than one type of binder-containing dispersed phase can be present within the continuous phase for form a mixed or heterogeneous dispersed phased system. In a mixed dispersed phased system each different type of binder-containing dispersed phase may comprise one or more photochromic dyes, permanent dyes or pigments; one or more additives and/or modifiers to alter the dye microenvironment and the color response characteristics of the photochromic dye or dyes; and one or more binders and/or binder layers, which can further serve to modify the dye color response characteristics. Accordingly, the dispersed phase can comprise a mixture of dispersed phases, each type with a different characteristic color, temperature sensitivity, activation or fading rate, based on the combination of different binders with the same or different colorants and modifiers. Use of such mixed dispersed phases will provide articles with no or some color under normal visible light, which adopt an additional color after irradiation, and which will fade over time after removal of the activating light back to the original state.

The amount, type and structure of the binders present in the dispersed phase is sufficient to prevent diffusion of the microenvironment modifiers and colorants contained within the dispersed phase into the continuous host matrix phase within the article. As such, the total amount of binder present is from about 5,000 parts-per-million per micrometer to about 20,000 parts-per-million per micrometer of path length through which the light, for example UV light, travels to activate the photochromic dye in the article. In general, there will be a similar amount of binder present to the total amount of colorants and modifiers in the dispersed phase.

In certain embodiments, in the dispersed phase a portion of the binders may also serve to modify the microenvironment of the colorants, depending on the details of location of the colorants and binders within the dispersed phase. The same functional groups that are effective in modifying colorant attributes as additives are also effective as part of the structural components present as the (co)monomers used to build the binders comprising the dispersed phase. Such functional groups include hydroxyl and ether groups (R—OH and $R_a$—O—$R_b$), ester groups ($R_a$—[C=O]—$OR_b$), ketone groups ($R_a$—[C=O]—$R_b$), amine groups ($R_a$-$NHR_b$), nitro groups (R—$NO_2$), carbonate groups ($R_a$O—[C=O]—$OR_b$), amide groups ($R_a$NH—[C=O]—$R_b$), urethane groups ($R_a$NH—[C=O]—$OR_b$), urea groups ($R_a$NH—[C=O]—$NHR_b$), imide groups ($R_a$—[C=O]—NH—[C=O]—$R_b$), hydrazide, semicarbazide and semicarbazone groups ($R_a$—[C=O]—NH—$NHR_b$, $R_a$—NH—[C=O]—NH—$NHR_b$ and $R_a$NH—[C=O]—NH—N=$CR_bR_c$), thiol and thioether groups (R—SH and $R_a SR_b$), sulfoxide and sulfone groups ($R_a$—[S=O]—$R_b$ and $R_a$—[$SO_2$]—$R_b$), ester groups ($R_a$—[$SO_2$]—$OR_b$), phosphines and phosphine oxides ($R_a R_b R_c$P and $R_a R_b R_c$P=O), esters ($R_a[R_bO]$-α[=O]—$OR_c$), phosphate esters $[RO]_3$P=O), and the like, which are polar (have high dielectric constants) and which can interact with the photochromic dyes by donating and/or accepting hydrogen bonds.

In addition to these binder functional groups acting to modify the local microenvironment around colorants to alter their performance attributes via through space (dipole-dipole) or direct interactions (such as hydrogen bonding), the (co)monomers can be selected to change the binder glass transition temperature, which also modifies photochromic dye response. In general, if the binder glass transition temperature is substantially higher than the ambient temperature at which the light is absorbed and activates the photochromic dye, the color transformations will be slower than if the binder glass transition temperature is similar to or substantially below the ambient temperature of irradiation. Since the ambient temperature also affects the rate of the reverse reaction of the photochromic dye back to its leuco form ($k_2$), a binder with a glass transition temperature similar to or slightly higher than the ambient temperature can serve to increase the concentration of the colored form of the photochromic dye during UV activation, increasing optical density (see FIG. 2 at 15 minutes).

A further characteristic of the dispersed phase binder systems is their detailed morphological or structural features. The binder systems of a given species of dispersed phase particle can be homogeneous or heterogeneous, where the heterogeneity can be on a molecular scale, such as in interpenetrating polymer networks, or on a larger scale, particularly where it is radial, i.e. the binder composition varies as a function of distance from the center of the dispersed phase particle. Such a structure has been referred to as a core-shell particle, where the outermost surface of the particle (the shell) has a chemical composition distinctly different from the innermost part of the particle (the core). The transition zones between the different radial compositions can be a tapered or gradient zone, where the composition of the binder changes gradually (over several to many covalent bond lengths) as the distance from the center of the dispersed phase particle increases, or a step change zone, where the composition of the binder changes suddenly over a short distance (on the order of a few to several covalent bond lengths).

In certain embodiments of the present invention, the modifiers employed in the dye matrix are confined or contained within the dispersed phase by crosslinking the core and/or particularly the shell with the modifiers. Alternatively, the modifiers employed in the dye matrix are confined or contained within the dispersed phase by selection based upon miscibility with the core but not the continuous phase, i.e. partitioning of the modifier.

In certain embodiments, polyisocyanate-containing monomers and oligomers are employed as binders in the dispersed phase. Aromatic isocyanates are more reactive with water, but their reaction with water will provide amine groups, which are co-reactive with isocyanates (forming urea linkages), and will lead to formation of higher molecular weight species. Their higher water reactivity compared to aliphatic isocyanates may complicate structural and molecular weight control of the oligomers or polymers within the core particles if the prepolymers are created in emulsion particles. For example, they can be used to pre-form higher molecular weight species (prepolymers) in an essentially water-free step, followed by their subsequent emulsification and interfacial reaction with water-soluble co-reactants.

Alternatively aliphatic isocyanates are less water-reactive, which allows better control of the molecular structures of the core particle components. In a similar manner, aliphatic isocyanates may be used to pre-form isocyanate-terminated prepolymers by reaction with non- or minimally water soluble co-reactants, which can subsequently be emulsified to form the core or seed particles, followed by interfacial polymerization with the fully water soluble co-reactants to form the shell. Alternatively, the aliphatic isocyanate monomers/oligomers and suitable co-reactants can be emulsified and allowed to form the isocyanate-terminated prepolymers in-situ prior to interfacial reaction with water soluble co-reactants to form the shell.

As a further provision, the formation of isocyanate prepolymers can be accomplished in the presence or absence of solvents, for example water insoluble solvents such as toluene, butyl acetate, and the like, which help solubilize other components whose presence in the emulsion core (seed) particles is desired, such as dyes or other functional additives (catalysts, antioxidants, etc.), as well as the co-reactants, such as (largely) water-insoluble polyols, for example polycaprolactone diols and minor amounts of water insoluble crosslinkers (containing 3 or more isocyanate-reactive end groups). The solvent may also reduce the viscosity of the prepolymer mixture, simplifying its subsequent emulsification.

A key attribute of the dispersed phase is the average size of the particles containing the colorants and their adjuvants. If the article is transparent and used in an optical device, the dispersed phase particles may be less than about 200 nanometers in diameter, less than about 100 nanometers in diameter, or less than about 50 nanometers in diameter. If the article is a surface coating applied for aesthetic or marking purposes, such as for example inks or decorative coatings, the particles can be larger.

There is no restriction to the use of a single colorant in the dispersed phase. More than one type of dye-containing dispersed phase can be present within the continuous phase, with each type comprise one or more photochromic dyes, permanent dyes or pigments to further modify the color of the final article. Thus, the dispersed phase can be comprised of a mixture of dispersed phases, each type with a different characteristic color, temperature sensitivity, activation or fading rate based on the colorants. Additionally, where a permanent color is desired in the unactivated state, non-photochromic colorants can be present in a portion of the dispersed phase, in the absence of a photochromic dye component. Use of such dispersed phases will provide articles with no or some color under normal visible light, which adopt an additional color after UV irradiation, and which will fade over time after removal of the activating UV light source back to the original colorless or colored state.

The amount of colorant, for example, photochromic dye, present in the dispersed phase is be sufficient to provide the desired degree of activated color formation (optical density or percent transmittance) within the article. As such, the photochromic dye present may be from about 100 parts-per-million per micrometer to about 5,000 parts-per-million per micrometer of path length through which the light travels to activate the photochromic dye in the article. This amount may vary by dye type, its molecular weight and extinction coefficient and the amount of color change desired, if dynamic, and the presence of other colorants such as permanent dyes or pigments, and their extinction coefficients.

The relationship between the amount of the dispersed colorant-containing phase and the continuous phase is analogous to the pigment volume concentration (PVC) commonly used to characterize decorative and protective coatings. This is defined as the percent volume occupied by the combined dispersed phases (the pigments plus fillers) relative to the total volume of the dried coating (total dispersed plus continuous phases=100 percent). Depending on the particulars of the formulation (pigment type and particle size distribution, resin/binder type, solvent vs water borne vs solventless coatings), the critical PVC (CPVC) is that point where there is just enough binder to completely wet-out the pigment. This value can vary from the mid 40 percent range up to more than 65 percent (approaching the theoretical limit for polydisperse spherical particles). Above the CPVC, the coating is less mechanically sound and more porous, while below the CPVC, the coating exhibits properties more characteristic of the unpigmented binder components.

Accordingly, the optimal volume of dispersed phase is below the CPVC for the combined dispersed colorant-containing phases and continuous host matrix phase mixture. This regime is where the properties of the continuous host matrix phase dominate the mechanical properties of the composition, and the dispersed colorant-containing phases are primarily important for their aesthetic contributions. As such, in this regime, the continuous and dispersed phases can be optimized independently for the end use. For example, the continuous phase can be optimized for adhesion to a substrate, flexibility, moisture and temperature resistance, etc. while the dispersed phase can be optimized for its color response attributes. In these compositions, where the dispersed phase resembles spherical particles with a narrow polydispersity, the PVC will be less than about 50 percent, or less than about 40 percent.

For dynamic colorants, the amount of for example, photochromic dye is inversely proportional to the volume percent of the dispersed phase contained within the continuous phase, and depends on the particular dye. For example, if the dispersed phase is 40 volume percent and the continuous phase is 60 volume percent, the nominal dye concentration must be 2.5 times greater than required to achieve the target optical density than would be required if the dye were uniformly distributed within the host or continuous phase. Alternatively, if the dispersed phase is 33 volume percent and the continuous phase is 67 volume percent, the nominal dye concentration must be 3 times greater than required to achieve the target optical density than would be required if the dye were uniformly distributed within the host or continuous phase The host matrix continuous phase may be comprise monomers, oligomers, (co)polymers, solvents, catalysts, stabilizing additives, processing aids, and the like as required to enable matrix formulation, formation and incorporation of the dispersed phase. In one or more subsequent steps, the mixture of liquid continuous phase and the dispersed phase is converted to the final form in which the photochromic properties of the dispersed phase will become incorporated in an article of commerce.

Certain embodiments of the present invention employ compositions comprising a continuous phase or host matrix in which two or more different dispersed phases particles with photochromic attributes are embedded.

Certain embodiments of the present invention comprise a dispersed phases having one or more colorants, at least a portion of which is a photochromic dye, one or more microenvironment modifiers and one or more binder materials to contain the active components that generate the principal optical effects.

Certain embodiments of the present invention employ mixtures of separate dispersed phase compositions individually selected to optimize photochromic dye color, activation and/or decay responses.

SYNTHESIS EXAMPLE

Step 1: NCO-terminated prepolymer formation. Combined 10.00 g of a 50 weight percent solution of CAPA 2101A (polycaprolactone diol) in toluene, 3.14 grams of a 50 weight percent solution of aliphatic diisocyanate ($H_{12}MDI$, Desmodure W) and 0.156 grams of a 5 weight percent solution of dibutyltin dilaurate (T-12 catalyst) at room temperature and allowed to react over two days, forming a clear viscous solution.

Step 2: Emulsification. Combined 3.02 grams of the NCO prepolymer solution of step 1 with 0.50 grams of a 12.5 weight percent solution of a photochromic dye in toluene and mixed until uniform, forming Solution A. Combined 4.00 grams of N,N-dimethyl lauramine-N-oxide surfactant solution in water, 2.00 grams of DI water and 1.50 grams of a 10.5 weight percent solution of Selvol Ultilok 5003 ($NH_2$ modified polyvinyl alcohol) in water to form Solution B.

Step 3. All of Solution B was added to all of Solution A and shaken to form a milky emulsion. Mixture was allowed to sit at ambient temperature for 2 hours, put into a 65 degrees Celsius oven for 3 hours, and then rolled overnight at ambient temperature. The final emulsion remained stable towards settling and the photochromic dye remained active to UV light.

Step 4. Centrifuged the emulsion and isolated portion of the emulsion particle solids and then dried the solids on filter paper. When dispersed in THF, the solids contained active dye and did not dissolve.

Alternative methods may include an additional amount of a water insoluble crosslinker added to the prepolymer solution (A) just prior to emulsification with Solution B to further crosslink the particle core.

Use of Encapsulated Dynamically Responsive Dye in Controlled Microenvironments

Figure 2:
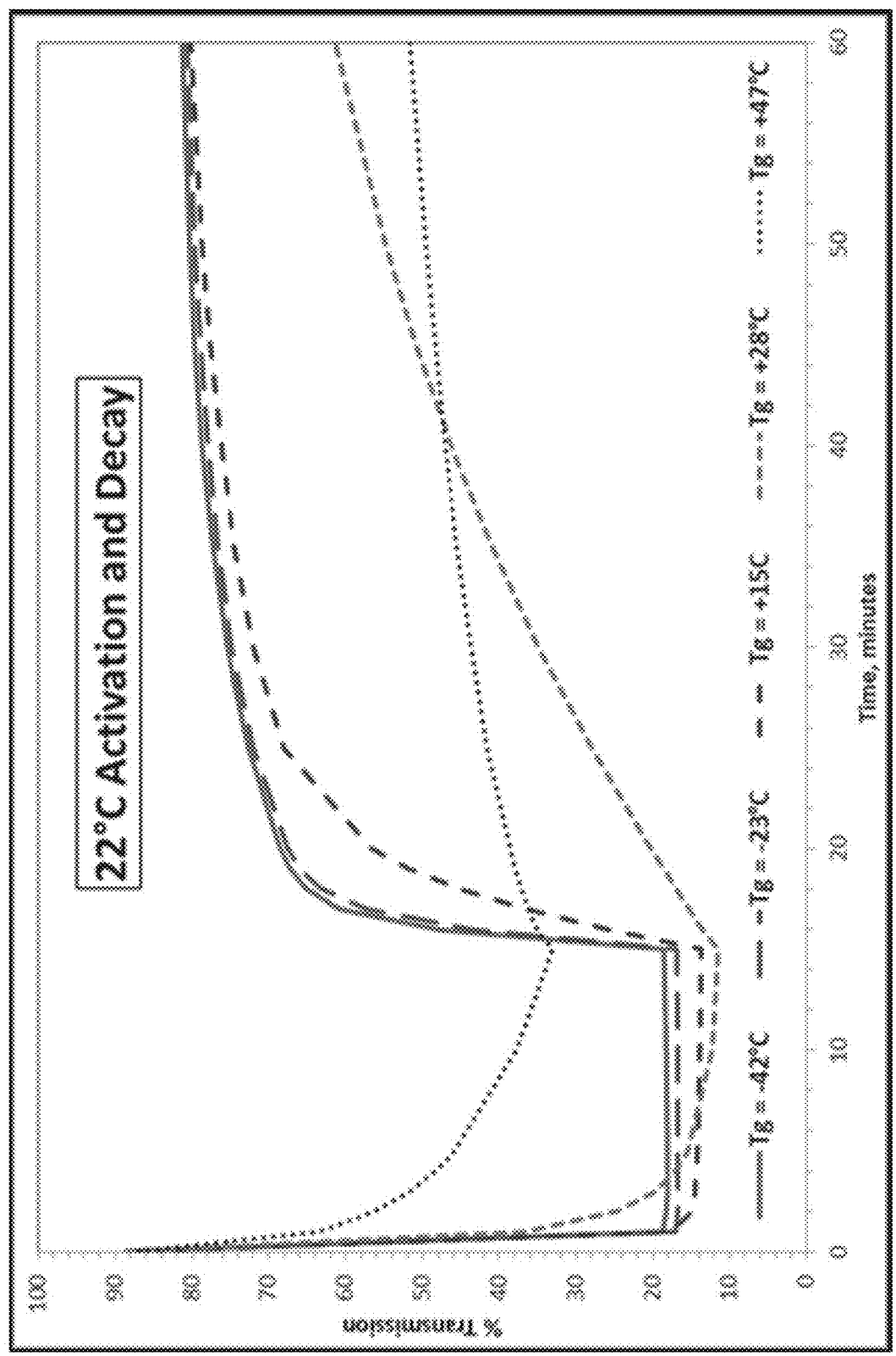
FIG. 2 is a graph showing examples of the optimization of dye activation and fading rates by manipulation of matrix glass transition temperature, according to one embodiment of the present invention.
Figure 3:
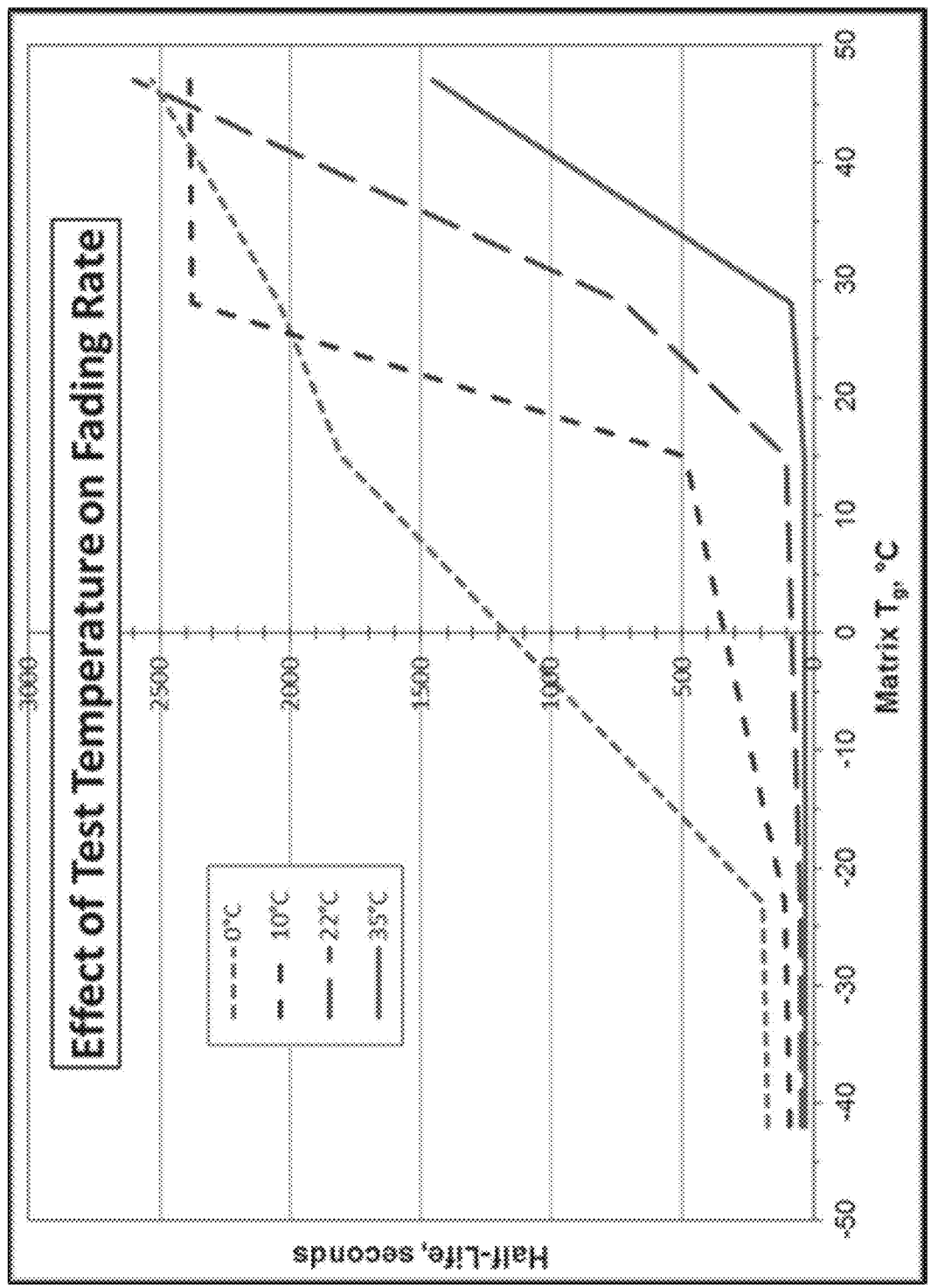
FIG. 3 is a graph showing examples of the optimization of dye fade rates by manipulation of matrix glass transition temperature, according to one embodiment of the present invention.

Controllable dye characteristics for dynamically responsive colorant systems according to the present invention include dye color response of activation (represented by a* and b* values in FIG. 1), and particularly, dye rates of activation and fade-back to the leuco (colorless) state (FIG. 2). Another controllable dye characteristic is the variability of dye response depending on the ambient temperature at which the system is externally stimulated.

As exemplified by photochromic dye behavior, in general, a given dye system, comprising one dye in one microenvironment/matrix, can achieve a higher optical density at lower temperatures than it can at elevated temperatures due to the combined influence of temperature on dye matrix segmental motion (relative to dye matrix glass transition temperature) and dye thermal reversion rate to the leuco form as expressed by the rate $k_2$. All chemical reactions are similarly affected by environment temperature: reaction rates are higher at higher temperatures and lower at lower temperatures. This is evident in systems where the temperature at activation is similar to or below the dye matrix glass transition temperature (see FIG. 2 at 15 minutes for samples with glass transition temperature of −42° C., −23° C. and +15° C.). Critically, both rates $k_1$ and $k_2$ depend strongly on the glass transition temperature of the dye microenvironment in relation to the ambient temperature at which the system was activated. This means that in a microenvironment with a glass transition temperature higher than the ambient activation temperature, the photochromic system will take longer to reach full activation or fade back to the unactivated color after the activation source is removed. Conversely, less time is required to interconvert between the leuco and activated state if the microenvironment glass transition temperature is below the activation temperature. In this way, the rates of color change, and the appearance and function of the article, can be adjusted in relation to the typical use temperature range.

Again, as exemplified by photochromic dye behavior, by combining dispersed phase particles having specific, and different, temperature response rates into a single continuous phase, the behavior of the article can be modified to respond in whatever manner is desired. For example, combining two types of dispersed phase particles, one with a low glass transition temperature microenvironment and the other with a high glass transition temperature microenvironment, will result in a photochromic system exhibiting a fast initial activation response followed by a gradual increase to the final desired optical density, which will subsequently decrease rapidly to an intermediate level and fade back to the leuco form gradually after removal of the UV activation source. By varying the ratio of each type of dispersed phase dye system present in the continuous host phase, and controlling the specific characteristics of the dispersed phase microenvironment, the relative rates of change ($k_1$ and $k_2$) and maximum optical density achieved can be tailored to the specific application.

Such photochromic compositions as these, as well as other dynamically responsive colorants, can be incorporated in finished articles of commerce in a variety of ways, principally as a component in a coating, as a component in a laminated structure, and as a component in a cast, extruded or molded article. Analogous to the use of conventional (permanent or passive) colorants (pigments and dyes) in these articles, mixtures of different dynamically responsive dispersed phases can be combined to fine-tune the aesthetic characteristics of the article, and unlike conventional passive colorants, color response characteristics can also be easily fine-tuned.

Coated Articles

Coated articles are prepared by application of a coating onto a substrate. Traditional coatings are typically formulated with an inert volatile solvent or diluent (organic liquids and/or water) in which are dissolved and/or suspended in a variety of components. Pigments (insoluble permanent colorants) and dyes (soluble permanent colorants) provide the aesthetic character and resinous film forming components (soluble or dispersed binders or vehicles) keep the colorants on the substrate and provide the desired mechanical characteristics dictated by the article's end use conditions. Other components are also generally present in a coating and fulfill other functional roles, such as catalysts to cure thermoset or photoset resins, additives to improve a coating's application characteristics (wetting and adhesion of the coating to the substrate, bubble release), stabilize the wet composition (towards premature cure, settling and aggregation or supporting biofouling organisms) or the dried finished coating (towards oxidative or UV degradation), increase or decrease surface gloss, etc.

Such coatings can be formulated as thermoplastic or thermoset/photoset materials. Thermoplastic formulations are distinguished by their lack of significant molecular weight growth after application, while thermoset/photoset systems are formulated from reactive components that undergo significant molecular weight growth after application, and which may contain reactive solvents or diluents that become a permanent part of the final dried coating. Typically, thermoset compositions are cured through exposure to heat, while photoset compositions are cured through exposure to UV or visible light. These reactive systems generally contain catalysts that are activated through heat and/or UV or visible light irradiation. Still other coatings are applied as thermoplastic or thermoset/photoset powders that are melted on the surface of the substrate to form a continuous film.

Coatings can range in applied thickness over a wide range, depending on their function, use environment, and the function of the article on which they are applied. Decorative coatings are generally applied at lower thickness than functional coatings, but again this depends on the substrate and its intended use. The compositions of this invention can be used in both protective and functional coatings.

As exemplified by photochromic dyes, dispersed phase photochromic components of the types disclosed in this invention can replace some or all of the permanent colorants (pigments or dyes) in the coatings to be used on or in the articles of this invention. These components provide for a dynamic color response of the article to its environment in the form of a response external stimuli, in this case to incident UV radiation. These dispersed phase photochromic components and the coating binders can be separately selected and/or formulated to provide the degree and nature of the performance attributes each type of component is expected to provide to the finished article.

For example, specific coated articles include transparent substrates such as ophthalmic lenses, motorsport visors, non-corrective eyewear, sportswear, goggles and windows for architectural and transportation end uses, variable neutral density filters for optical devices, active or passive graphic display devices, graphic decoration on rigid and flexible substrates such as glass, plastic and metal containers, paper, foil and film for shelf display and product label applications, among others. They can also be used in coatings and inks sold use for decorative and functional purposes on other substrates, including sporting goods, currency and security applications, fabrics and textiles, particularly room darkening draperies, curtains, shades and transparent or translucent films for residential and commercial buildings, novelty nail polishes, lip gloss, hair sprays, eye shadow and related cosmetic applications, and as dynamically responsive colorants sold to manufacturers to be formulated into functional and decorative coatings to be applied professionally or by consumers to a range of other substrates.

Laminated Articles

Laminated dynamically responsive colored articles may be prepared by application of a photochromic, electrochromic or liquid crystal containing coating onto a filmic substrate, which is then incorporated into a structure in such a way that the dynamically responsive coating is not on an outermost surface. Such an illustrative process involves coating the dynamically responsive composition onto a release liner or directly onto a transparent filmic substrate. If coated onto a release liner, the coating must be transferred to the filmic substrate to be incorporated into the final article. If directly coated onto the filmic substrate, this coated substrate must be incorporated into the final article. Thus, the coated side of the filmic substrate is either covered with another filmic substrate, both of which are typically transparent, so as to allow the dynamic response to be visible, or placed in contact with an external surface of the article by one of several additional process steps.

For example, the original coated filmic substrate can be applied to the surface of an article or another filmic substrate that is converted to the final article in one or more conversion process steps, including molding. For example, a photochromic coating on a transparent filmic substrate can be placed within a mold cavity such that the photochromic coating is oriented towards the interior of the mold cavity, which is subsequently filled with the material of article construction. Additionally, a photochromic coating, located between two transparent filmic substrates, can be placed within a mold, and the article made by injection molding with a molten transparent thermoplastic material or a transparent liquid thermoset material. In these processes, the original laminate, comprising the photochromic coating, on one or between two transparent filmic substrates, becomes an outer surface of the article, but the photochromic layer is contained within a laminate structure and protected from direct contact with the external environment.

Laminates may be manufactured using coatings formulated with inert volatile solvents, or containing reactive diluents, or by direct extrusion of a molten liquid composition directly onto a filmic substrate, typically in a roll-to-roll process, among other methods. If a volatile solvent is employed, the coated filmic substrate must be dried before the next process step. The coating applied to the filmic substrate may be comprise the volatile diluent (organic liquids and/or water) in which are dissolved and/or suspended a variety of components. The colorants can include the mixed dynamically responsive dispersed phases as described above, pigments (insoluble permanent colorants) and dyes (soluble permanent colorants), which provide the aesthetic character of the laminate, and resinous film forming components (soluble or dispersed binders or vehicles), which provide the desired adhesive and mechanical characteristics dictated by the article's end use conditions. Additional components can also be present to fulfill other functional roles, such as catalysts to cure thermoset or photoset resins, to improve application characteristics, such as wetting, flow-out and adhesion of the coating to the substrate, or bubble release, stabilize the liquid composition towards premature cure, settling and aggregation of the dispersed phase or supporting biofouling organisms prior to application to the filmic substrate—for long term storage or pot-life considerations, or to stabilize the dried finished coating towards oxidative or UV degradation, etc. in the end use application.

Such laminates can be formulated with thermoplastic, thermoset or photoset interlayer binders between the transparent filmic substrates, which binders carry the dispersed phase dynamically responsive colorants. Thermoplastic formulations are distinguished by their lack of significant molecular weight growth after application, and will generally contain a volatile component, or may be applied by extrusion in a molten state. In the event that a volatile solvent is employed for coating application to the filmic substrate, it must be driven from the coating prior to further process steps. Thermoset and photoset systems are formulated from reactive components that undergo significant molecular weight growth after application, and which may contain volatile solvents which must be driven from the coating prior to the next process steps, or reactive solvents or diluents that become a permanent part of the final dried coating.

For example, specific laminated articles include transparent substrates such as ophthalmic lenses and windows for architectural and transportation end uses, variable neutral density filters for optical devices, active or passive graphic display devices, graphic decoration on rigid and flexible substrates such as glass, plastic and metal containers, paper, foil and film for shelf display and product label applications, among others. They can be sold and used in transparent or translucent roll or sheet form for further conversion to dynamically responsive articles, including decorative and functional purposes on other substrates, such as in sporting goods, as a component in various security and anti-counterfeiting measures, fabrics and textiles, particularly in structures intended for use as room darkening draperies, curtains, shades and films for residential and commercial buildings, and as dynamically responsive colorants sold to manufacturers to be formulated into dynamically responsive functional and decorative laminates.

Molded and Extruded Articles

Molded and extruded dynamically responsive articles may be prepared by incorporation of one or more dynamically responsive dispersed phases into transparent or translucent molding resins, which are then converted into a molded or extruded article. An illustrative process involves blending a photochromic dispersed phase with a molding resin, such as a transparent liquid thermoset composition, filling a mold with the combined composition, and curing the liquid mixture to form a solid transparent article, such as an ophthalmic lens.

The dynamically responsive molding resin may be comprise variety of components. The colorants can include the mixed dynamically responsive dispersed phases as described above, pigments (insoluble permanent colorants) and dyes (soluble permanent colorants), which together provide the aesthetic and/or functional character in the molded article, and resinous components, which provide the desired mechanical characteristics dictated by the article's end use conditions. Additional components can also be present to fulfill other functional roles, such as catalysts to cure thermoset or photoset resins, additives that improve process characteristics, such as resin rheology and mold-release, stabilize a liquid thermoset or photoset composition towards premature cure or settling of the dispersed phase prior to molding—for long term storage or pot-life considerations, or to stabilize the finished article towards oxidative or UV degradation, etc. in the end use application.

Such molded articles can be formulated from thermoplastic, thermoset or photoset resinous compositions. Thermoplastic formulations are distinguished by their lack of significant molecular weight growth after molding, and will generally be formed into articles by injection molding or extrusion in a molten state. Thermoset and photoset systems are formulated from reactive components that undergo significant molecular weight growth during or subsequent to molding or extruding, and which may contain reactive solvents or diluents that become a permanent part of the final molded or extruded article in addition to higher molecular weight oligomeric or resinous components.

Specific examples of molded articles include transparent compositions such as ophthalmic lenses and windows for architectural and transportation end uses, variable neutral density filters for optical devices, and as containers for light sensitive contents. Dynamically responsive compositions can also be extruded into fibers for conversion into novelty fabrics and textiles for apparel, and particularly functional fabrics and textiles for room darkening draperies, curtains and shades, or transparent or translucent molded sheet or roll form for further conversion to photochromic articles, including for decorative and functional purposes when combined with other substrates, or converted directly to sporting goods and accessories, security or anti-counterfeiting devices. Thermoplastic, thermoset or photoset compositions containing dynamically responsive dispersed phase colorants can also be converted by molding or extrusion into amusing novelties (beads, rings, bracelets, buttons, combs, hair clips, visors and hat brims, umbrellas, doll hair, etc.), and toys, artificial fingernails, and the like, which will change color when exposed to the appropriate external stimulus, which activates the color change.

Certain embodiments of the present invention comprise a continuous phase host matrix in which a dispersed phase with dynamically responsive attributes is embedded.

Certain dispersed phases according to the present invention comprise one or more colorants, at least a portion of which is a photochromic dye, one or more microenvironment modifiers and one or more binder materials to contain the active components that generate the principal optical effects.

Certain dispersed phases according to the present invention comprise one or more colorants, at least a portion of which is an electrochromic dye, one or more microenvironment modifiers and one or more binder materials to contain the active components that generate the principal optical effects.

Certain dispersed phases according to the present invention comprise one or more colorants, at least a portion of which is a liquid crystal dye, one or more microenvironment modifiers and one or more binder materials to contain the active components that generate the principal optical effects.

Certain embodiments of the present invention comprise coatings, laminates, extruded and/or molded articles fabricated from a continuous phase host matrix in which a dispersed phase with dynamically responsive attributes is embedded.

Certain coatings according to the present invention are thermoplastic, thermoset or photoset.

Certain embodiments of the present invention comprise coated articles made with a continuous phase host matrix in which a dispersed phase with dynamically responsive attributes is embedded.

Certain coated articles according to the present invention comprise a thermoplastic, thermoset and/or photoset coating.

Certain coated articles according to the present invention are transparent.

Certain coated articles according to the present invention are translucent.

Certain coated articles according to the present invention are optically clear.

Certain coated articles according to the present invention are ophthalmic lenses.

Certain coated articles according to the present invention are non-corrective eyewear, goggles or visors.

Certain coated articles according to the present invention are windows.

Certain coated articles according to the present invention are active displays.

Certain coated articles according to the present invention are user controlled by user input.

Certain coated articles according to the present invention are dynamically responsive to their environment.

Certain laminates according to the present invention are thermoplastic, thermoset or photoset.

Certain embodiments of the present invention comprise coated articles made with a continuous phase host matrix in which a dispersed phase with dynamically responsive attributes is embedded.

Certain laminated articles according to the present invention are transparent.

Certain laminated articles according to the present invention are translucent.

Certain laminated articles according to the present invention are optically clear.

Certain laminated articles according to the present invention are ophthalmic lenses.

Certain laminated articles according to the present invention are non-corrective eyewear, goggles or visors.

Certain laminated articles according to the present invention are windows.

Certain laminated articles according to the present invention are active displays.

Certain laminated articles having active displays according to the present invention are user controlled by user input.

Certain laminated articles having active displays according to the present invention are dynamically responsive to their environment.

Certain extrudates according to the present invention are thermoplastic, thermoset and/or photoset.

Certain extrudates according to the present invention are fibers or films.

Certain embodiments of the present invention comprise extruded articles made with a continuous phase host matrix in which a dispersed phase with dynamically responsive attributes is embedded.

Certain extruded articles according to the present invention are fibers, fabrics or textiles.

Certain embodiments of the present invention comprise finished articles that are made with fibers, fabrics or textiles.

Certain embodiments of the present invention comprise molded articles made with a continuous phase host matrix in which a dispersed phase with dynamically responsive attributes is embedded.

Certain molded articles according to the present invention are transparent.

Certain finished molded articles according to the present invention are transparent.

Certain finished molded articles according to the present invention are translucent.

Certain finished molded articles according to the present invention are optically clear.

Certain finished molded articles according to the present invention are non-corrective eyewear, goggles or visors.

Certain finished molded articles according to the present invention are ophthalmic lenses.

Certain finished molded articles according to the present invention are windows.

Certain finished molded articles according to the present invention are active displays.

Certain molded articles having active displays according to the present invention are user controlled by user input.

Certain molded articles having active displays according to the present invention are dynamically responsive to their environment.

Certain molded articles according to the present invention are containers or packaging.

Certain molded articles according to the present invention are transparent or translucent.

Certain molded articles according to the present invention are toys or novelties.

Certain molded articles according to the present invention are wearable fashion or functional accessories.

Certain molded articles according to the present invention are non-corrective eyewear, goggles or visors or hat-brims, beads, rings, bracelets, buttons, combs, hair clips, umbrellas, doll hair, artificial fingernails or toys.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method for controlling a characteristic of a photochromic dye comprising:
    selecting a composition of a first microenvironment immediately surrounding a first photochromic dye to control a characteristic of the first photochromic dye through non-covalent interaction between the first photochromic dye and the first microenvironment;
    creating a first particle comprising the first photochromic dye and the microenvironment immediately surrounding the first photochromic dye;
    incorporating the first particle within a continuous adhesive host phase having a composition distinct from the composition of the first microenvironment immediately surrounding the first photochromic dye, the host phase being flexible upon curing or complete reaction; and
    permanently containing the composition of the first microenvironment and the photochromic dye inside said first particle without being diffused into said adhesive host phase.

2. The method of claim 1 wherein selecting the composition of the first microenvironment immediately surrounding the first photochromic dye to control the characteristic of the first photochromic dye comprises controlling a glass transition temperature of the first microenvironment immediately surrounding the first photochromic dye.

3. The method of claim 1 wherein selecting the composition of the first microenvironment immediately surrounding the first photochromic dye to control the characteristic of the first photochromic dye comprises selecting the composition of the first microenvironment immediately surrounding the first photochromic dye to control a through-space polar interaction of the first photochromic dye with the first microenvironment immediately surrounding the first photochromic dye.

4. The method of claim 1 wherein selecting the composition of the first microenvironment immediately surrounding the first photochromic dye to control the characteristic of the first photochromic dye comprises selecting the composition of the first microenvironment immediately surrounding the first photochromic dye to control both a glass transition temperature of the first microenvironment immediately surrounding the first photochromic dye and a hydrogen bonding of the first photochromic dye with the first microenvironment immediately surrounding the first photochromic dye to control a rate of color change of the first photochromic dye.

5. The method of claim 1 wherein selecting the composition of the first microenvironment immediately surrounding the first photochromic dye to control the characteristic of the first photochromic dye comprises controlling a neutral color tone of the first photochromic dye.

6. The method of claim 1 wherein creating a first particle comprising the first microenvironment immediately surrounding the first photochromic dye and the first photochromic dye comprises forming a polymeric shell around the first microenvironment immediately surrounding the first photochromic dye and the first photochromic dye.

7. The method of claim 1 wherein incorporating the first particle within the host phase having the composition distinct from the composition of the first microenvironment immediately surrounding the first photochromic dye comprises incorporating the first particle within a layer of a transparent material.

8. The method of claim 1 wherein selecting the composition of the first microenvironment immediately surrounding the first photochromic dye to control the characteristic of the first photochromic dye comprises selecting the composition of the first microenvironment immediately surrounding the first photochromic dye to control a hydrogen bonding of the first photochromic dye with the first microenvironment immediately surrounding the first photochromic dye to control both a rate of color change and a color of the first photochromic dye.

9. The method of claim 1 wherein selecting the composition of the first microenvironment immediately surrounding the first photochromic dye to control the characteristic of the first photochromic dye comprises selecting the composition of the first microenvironment immediately surrounding the first photochromic dye to interact by both direct contact and through-space polar interaction with the first photochromic dye to control a color of the first photochromic dye.

10. The method of claim 1 further comprising:
selecting a composition of a second microenvironment immediately surrounding the first photochromic dye distinct from the first microenvironment immediately surrounding the first photochromic dye;
creating a second particle comprising the second microenvironment immediately surrounding the first photochromic dye and the first photochromic dye; and
incorporating the second particle within the host phase having a composition distinct from the composition of the second microenvironment immediately surrounding the first photochromic dye.

11. The method of claim 1 further comprising:
selecting a composition of a second microenvironment immediately surrounding a second photochromic dye to control a characteristic of the second photochromic dye, the second microenvironment immediately surrounding the second photochromic dye distinct from the first microenvironment immediately surrounding the first photochromic dye and the second photochromic dye distinct from the first photochromic dye;
creating a second particle comprising the second microenvironment immediately surrounding the second photochromic dye and the second photochromic dye; and
incorporating the second particle within the host phase having a composition distinct from the composition of the second microenvironment immediately surrounding the second photochromic dye.

12. A method for controlling a characteristic of a photochromic dye comprising:
obtaining a photochromic dye;
immediately surrounding the photochromic dye with a microenvironment tuned to control a characteristic of the photochromic dye through non-covalent interaction between the photochromic dye and said microenvironment; and
incorporating the photochromic dye and the microenvironment immediately surrounding the photochromic dye into a shell structure;
said immediately surrounding the photochromic dye with the microenvironment tuned to control the characteristic of the photochromic dye and said incorporating the photochromic dye and the microenvironment immediately surrounding the photochromic dye into the shell structure occur in a same reaction mixture and substantially concurrently;
incorporating the shell structure within an adhesive host phase and permanently containing the photochromic dye and the microenvironment inside said shell structure without being diffused into said adhesive host phase.

13. The method of claim 12 wherein said immediately surrounding the photochromic dye with the microenvironment tuned to control the characteristic of the photochromic dye and said incorporating the photochromic dye and the microenvironment immediately surrounding the photochromic dye into the shell structure comprise:
(a) combining the photochromic dye and a surfactant with one or more component selected from the group consisting of a monomer, an oligomer, a prepolymer, and a polymer to form a composition; and
(b) emulsifying the composition.

14. The method of claim 13 wherein combining the photochromic dye and the surfactant with the one or more component selected from the group consisting of the monomer, the oligomer, the prepolymer, and the polymer to form the composition comprises combining one or more component selected from the group consisting of a monomer, an oligomer, a prepolymer, and a polymer that form hydrogen bonds with the photochromic dye.

15. The method of claim 13 wherein combining the photochromic dye and the surfactant with the one or more component selected from the group consisting of the monomer, the oligomer, the prepolymer, and the polymer to form the composition comprises combining one or more component selected from the group consisting of a monomer, an oligomer, a prepolymer, and a polymer that forms through-space polar interactions with the photochromic dye.

16. The method of claim 13 wherein combining the photochromic dye and the surfactant with the one or more component selected from the group consisting of the monomer, the oligomer, the prepolymer, and the polymer to form the composition further comprises combining an additive that forms through-space polar interactions with the photochromic dye.

17. The method of claim 13 wherein combining the photochromic dye and the surfactant with the one or more component selected from the group consisting of the monomer, the oligomer, the prepolymer, and the polymer to form the composition further comprises combining an additive that forms hydrogen bonds with the photochromic dye.

18. The method of claim 13 wherein combining the photochromic dye and the surfactant with the one or more component selected from the group consisting of the monomer, the oligomer, the prepolymer, and the polymer to form the composition further comprises combining a solvent.

19. The method of claim 13 wherein combining the photochromic dye and the surfactant with the one or more component selected from the group consisting of the monomer, the oligomer, the prepolymer, and the polymer to form the composition further comprises combining an additive comprising an ionic compound.

20. The method of claim 13 wherein combining the photochromic dye and the surfactant with the one or more component selected from the group consisting of the monomer, the oligomer, the prepolymer, and the polymer to form the composition further comprises combining a crosslinker.

21. The method of claim 13 wherein combining the photochromic dye and the surfactant with the one or more component selected from the group consisting of the monomer, the oligomer, the prepolymer, and the polymer to form the composition comprises selecting a component that controls both a rate of color change of the first photochromic dye and a color of the first photochromic dye in the microenvironment immediately surrounding the photochromic dye.

22. The method of claim 12 further comprising incorporating the shell structure within the adhesive host phase that is distinct from the microenvironment immediately surrounding the photochromic dye.

23. The method of claim 1, wherein a size of said first particle is less than about 200 nm in diameter.

24. The method of claim 1, wherein a size of said first particle is less than about 100 nm in diameter.

25. The method of claim 1, wherein a size of said first particle is less than about 50 nm in diameter.

26. The method of claim 12, wherein a size of said shell structure is less than about 200 nm in diameter.

27. The method of claim 12, wherein a size of said shell structure is less than about 100 nm in diameter.

28. The method of claim 12, wherein a size of said shell structure is less than about 50 nm in diameter.

* * * * *